United States Patent
Kompalli et al.

(10) Patent No.: US 9,938,190 B2
(45) Date of Patent: *Apr. 10, 2018

(54) PREMIXED HYBRID GROUT

(71) Applicant: LATICRETE INTERNATIONAL, INC., Bethany, CT (US)

(72) Inventors: Rajeswari Kompalli, Bethany, CT (US); Randall P. Bright, Naugatuck, CT (US)

(73) Assignee: LATICRETE INTERNATIONAL, INC., Bethany, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,721

(22) Filed: Sep. 16, 2016

(65) Prior Publication Data

US 2017/0029331 A1 Feb. 2, 2017

Related U.S. Application Data

(60) Continuation of application No. 15/092,000, filed on Apr. 6, 2016, now Pat. No. 9,446,987, which is a division of application No. 14/290,055, filed on May 29, 2014, now Pat. No. 9,340,458.

(60) Provisional application No. 61/829,143, filed on May 30, 2013.

(51) Int. Cl.
| | |
|---|---|
| C04B 26/06 | (2006.01) |
| C04B 14/06 | (2006.01) |
| C04B 14/22 | (2006.01) |
| C04B 14/28 | (2006.01) |
| C04B 26/16 | (2006.01) |
| C04B 14/04 | (2006.01) |
| C04B 26/10 | (2006.01) |
| C04B 111/70 | (2006.01) |

(52) U.S. Cl.
CPC .............. *C04B 26/06* (2013.01); *C04B 14/04* (2013.01); *C04B 14/06* (2013.01); *C04B 14/22* (2013.01); *C04B 14/28* (2013.01); *C04B 26/10* (2013.01); *C04B 26/16* (2013.01); *C04B 2111/70* (2013.01); *Y02W 30/94* (2015.05)

(58) Field of Classification Search
CPC ......... C04B 26/16; C04B 26/06; C04B 14/06; C04B 14/22; C04B 14/28
USPC ....................................................... 523/122
See application file for complete search history.

(56) References Cited

U.S. PATENT DOCUMENTS

| | | |
|---|---|---|
| 3,859,233 A | 1/1975 | Barker |
| 3,940,358 A | 2/1976 | Bernett et al. |
| 4,153,764 A | 5/1979 | Blount |
| 4,243,768 A | 1/1981 | Simpson |
| 4,322,327 A | 3/1982 | Yoshimura et al. |
| 4,472,540 A | 9/1984 | Barker |
| 4,476,276 A | 10/1984 | Gasper |
| 4,985,340 A | 1/1991 | Palazzotto et al. |
| 5,500,253 A | 3/1996 | Sanduja et al. |
| 5,531,546 A | 7/1996 | Herdlicka et al. |
| 5,569,696 A | 10/1996 | Abramson et al. |
| 5,574,083 A | 11/1996 | Brown et al. |
| 5,594,065 A | 1/1997 | Tien et al. |
| 5,945,473 A | 8/1999 | Kielbania et al. |
| 5,977,215 A | 11/1999 | Tien et al. |
| 6,063,861 A | 5/2000 | Irle et al. |
| 6,069,217 A | 5/2000 | Nae et al. |
| 6,153,690 A | 11/2000 | Larson et al. |
| 6,156,840 A | 12/2000 | Nakamae et al. |
| 6,197,874 B1 | 3/2001 | Irle et al. |
| 6,384,110 B1 | 5/2002 | Gooch et al. |
| 6,562,894 B1 | 5/2003 | Blum et al. |
| 6,590,025 B1 | 7/2003 | Carlson et al. |
| 6,787,596 B1 | 9/2004 | Maier et al. |
| 6,806,341 B2 | 10/2004 | Fischer et al. |
| 6,992,138 B2 | 1/2006 | Tsuji et al. |
| 7,005,462 B2 | 2/2006 | Schad et al. |
| 7,183,338 B1 | 2/2007 | Warren |
| 7,265,178 B2 | 9/2007 | Maier et al. |
| 7,414,092 B2 | 8/2008 | Steidl et al. |
| 7,462,679 B1 | 12/2008 | Xiao |
| 7,534,830 B2 | 5/2009 | Williams |
| 7,786,207 B2 | 8/2010 | Licht et al. |
| 7,981,962 B1 | 7/2011 | Schad et al. |
| 7,994,250 B2 | 8/2011 | Origuchi et al. |
| 8,137,754 B2 | 3/2012 | Lai et al. |
| 8,263,694 B1 | 9/2012 | Warren et al. |
| 8,461,256 B2 | 6/2013 | Conner et al. |
| 9,340,458 B2 * | 5/2016 | Kampalli ................ C04B 26/06 |
| 2004/0034146 A1 | 2/2004 | Gertzmann et al. |
| 2005/0124735 A1 | 6/2005 | Schad et al. |
| 2005/0197437 A1 | 9/2005 | Kyte |
| 2009/0163630 A1 | 6/2009 | Jefferson et al. |
| 2010/0081742 A1 | 4/2010 | Moore |
| 2011/0245399 A1 | 10/2011 | Pajerski et al. |
| 2012/0116004 A1 | 5/2012 | Lu |
| 2012/0160414 A1 | 6/2012 | Pámpanas et al. |
| 2012/0171914 A1 | 7/2012 | Lai et al. |
| 2012/0270992 A1 | 10/2012 | Larock et al. |
| 2012/0295023 A1 | 11/2012 | Dombrowski et al. |
| 2013/0253107 A1 | 9/2013 | Iyer et al. |

FOREIGN PATENT DOCUMENTS

EP          0586782 A1      3/1994

OTHER PUBLICATIONS

PCT/US2014/039956 Written Opinion and International Search Report dated Sep. 24, 2014.

* cited by examiner

*Primary Examiner* — Deve E Valdez

(74) *Attorney, Agent, or Firm* — DeLio, Peterson & Curcio, LLC; Kelly M. Nowak

(57) ABSTRACT

Grouts, grout products and methods of applying such grouts that include a urethane-acrylic hybrid polymer dispersion (UA-HPD) and a filler material. The UA-HPD may be present in an amount of about 10-40% by weight of the composition, while the filler material may be present in an amount of about 60-90% by weight of the composition. Additional filler materials may also be provided within the UA-HPD grout composition to provide the resultant UA-HPD grout with desired characteristics and properties. The UA-HPD containing grouts are applied between spaced-apart tiles and/or masonry to fill voids and/or joints therebetween.

20 Claims, 7 Drawing Sheets

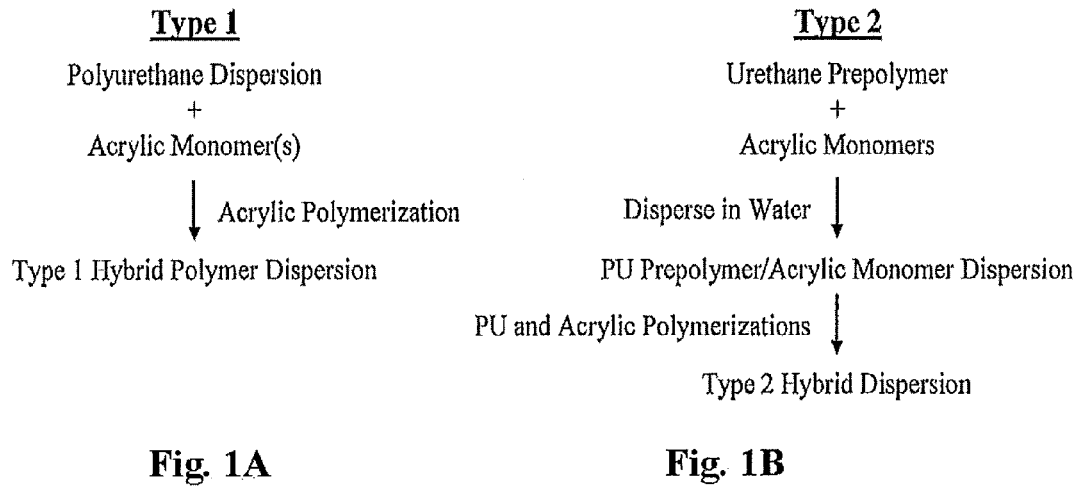
Fig. 1A
Fig. 1B
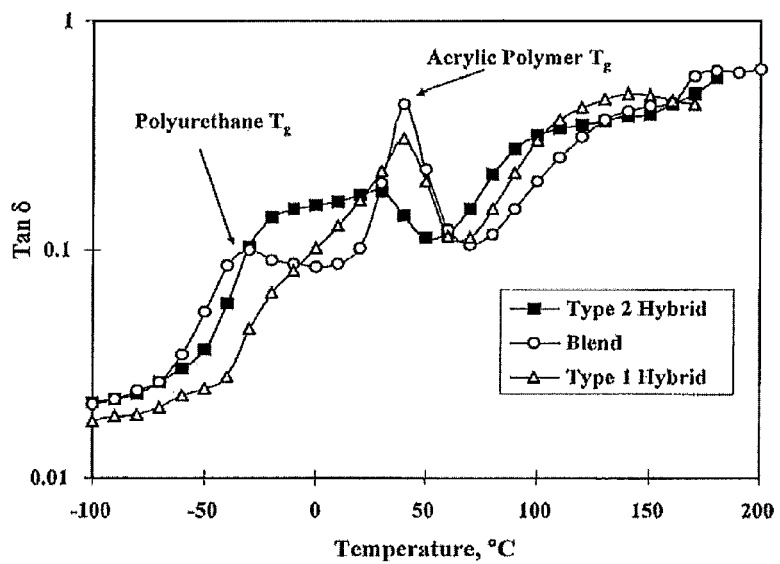
Fig. 2

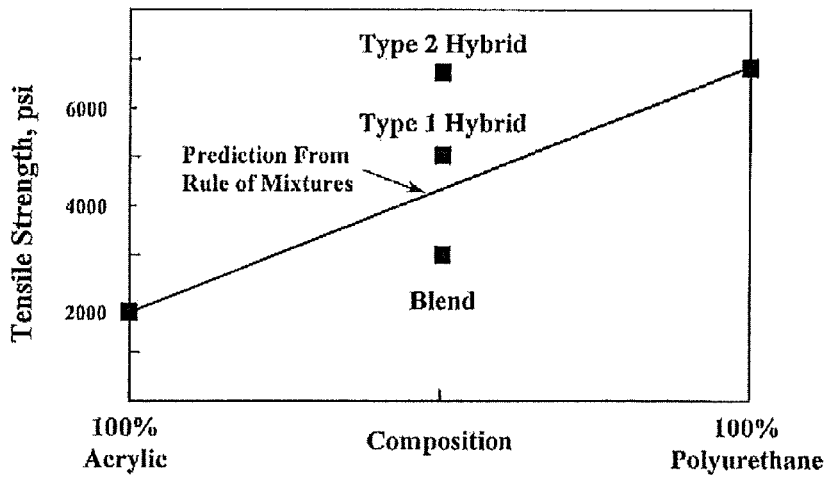

Fig. 3

Table 1. Typical Characteristics of the Type 2 Hybrid Polymer Dispersions Evaluated.

| Property | Hybrid A [a] | Hybrid B [b] | Hybrid A$_{SF}$ [c] | Hybrid B$_{SF}$ [d] |
|---|---|---|---|---|
| Appearance | Opaque, Slight Milky | Opaque, Slight Milky | Opaque, Slight Milky | Opaque, Slight Milky |
| Viscosity, cP, 25 °C, Brookfield | 50 - 150 | 50 - 150 | 50 - 150 | 50 - 150 |
| Non-Volatiles, % by weight | 39 - 41 | 39 - 41 | 39 - 41 | 39 - 41 |
| Solvent Content, % by weight | 6 | 6 | <0.2 | <0.1 |
| Solvent | NMP | NMP | Acetone | Acetone |
| VOC, g/L (lbs/gal) [e] | 160 (1.33) | 164 (1.37) | 30 (0.25) | 24 (0.20) |
| Density, g/mL (lbs/gal) | 1.03 (8.60) | 1.04 (8.70) | 1.05 (8.76) | 1.07 (8.93) |
| pH | 7.5 – 9.0 | 7.5 – 9.0 | 7.5 – 9.0 | 7.5 – 9.0 |
| Acid Number, mg KOH/g [f] | 14.5 | 14.5 | 16.0 | 14.5 |
| $T_g$ Range, °C [g] | -35 to 35 | -35 to 100 | -35 to 35 | -35 to 100 |
| Neutralizing Amine [h] | TEA | TEA | TEA | DMEA |
| Particle Diameter (Wt. Avg.), nm | 75 – 85 [i] | 75 - 85 [i] | 75 - 85 [i] | 75 - 85 [i] |
| Residual Acrylic Monomer, ppm | 500 [i] | 500 [i] | 50 - 200 [i] | 10 - 50 [i] |
| Particle Charge | Anionic | Anionic | Anionic | Anionic |
| [a, b, c, d] Refer to Appendix C for material identification. ||||| 
| [e] VOC includes contribution from the neutralizing amine (~1% by weight). |||||
| [f] Calculated on a solids basis. |||||
| [g] $T_g$s estimated from DMA measurements (breadth of tan δ peak) and polymer compositions. |||||
| [h] TEA = triethylamine; DMEA = dimethylethanolamine.   [i] Typical values. |||||

Fig. 4

| Minimum Constituents | Function | Examples | % Usage/ Range |
|---|---|---|---|
| UA-HPD (e.g., Hybridur) | Binder | | 10-40% |
| Sand, glass, limestone and other minerals | Filler | | 60-90% |
| | | | |
| One or More Additional Constituents | Function | Examples | % Usage/ Range |
| Thickener | Improved shelf stability (minimizing separation or settling of ingredients). Improved rheology (Workability) | Cellulose ether, starch ether, fibers, fumed silica, associative and alkali swellable thickeners. | 0-3% |
| Preservative (Biocide) | Increase shelf life by inhibiting biological growth | | 0-1% |
| Fungicide and/or mildewcide | Improved performance by minimizing biological growth in use. | | 0-1% |
| Defoamer | Reduces air entrainment during manufacturing and application. Improve strength, improve stain resistance. | | 0-3% |
| Other fillers | Filling voids between larger particles to improve shrinkage, hardness, reduce porosity, improve water resistance. | Fine silica, limestone (calcium carbonate), other mineral fillers. | 0-80% |
| Decorative fillers | Improved aesthetics. Achieve special effect. | Reflective particles, glass or colored beads, dyes and pigments. | 0-10% |
| Film forming aids (co-solvents) | Improve film formation at lower temperatures, ultimately, higher strength and hardness. Can improve stability to freezing and thawing. | | 0-15% |

Fig. 5A

| One or More Additional Constituents Continued | Function | Examples | % Usage/ Range |
|---|---|---|---|
| Crosslinkers or other reactive components | Improve hardness, water resistance, chemical resistance, stain resistance, abrasion resistance | Polyacrylic acid compounds. | 0-5% |
| Stain resistant additives | Improve resistance to water-baseed and/or oil-based stains. Improved water and oil resistance. | Wax emulsions, wax particles, fluoro-carbon based particles and emulsions, silicone-based particles and emulsions, hydrophobes such as oleates and stearates | 0-5% |
| Adhesion promotors or coupling agents | Improve bonding or compatibility between binder and fillers or substrates. | | 0-5% |
| Anti-freeze | Reduce freezing point to prevent damage during extreme temperatures. Improved storage stability. | Glycols, Various co-solvents | 0-5% |
| Surfactants | Improve wetting of fillers and of substrates. Reduce viscosity. Eliminate entrained air. Stabilize formulation. | | 0-5% |
| Water | Diluent. Reduce viscosity. | | 0-10% |
| Water retention aid | Hold moisture into system in use, so as to improve application characteristics and assist cleanup. | Cellulose ethers, starches, co-solvents. | 0-5% |
| UV Stabilizers | Improve resistance to UV light. Improved color stability. Reduce yellowing or discoloration. | | 0-5% |
| Acid or base | Adjust pH. Improve stability of formulation. | | 0-5% |
| Alternate Binders | Provide reduced performance at a reduced cost | Blends with conventional binders such as acrylics. | 0-25% |
| Fibers | Improve cohesive strength of wet formula, improve strength when cured, reduce shrinkage, reduce cracking. | Various types of polymer or glass fibers of various lengths can be used. | 0-5% |

Fig. 5B

| Component | UA-HPD Grout Example 1 Amount Range in Composition | UA-HPD Grout Example 2 Amount Range in Composition |
|---|---|---|
| Freeze-Thaw Stabilizer/Co-solvent | 0.85-0.95% | 0.8-1.5% |
| Short Filler/Rheologicial Modifier -Short Fibers (Polyethylene) | 0-0.3% | 0-0.3% |
| Adhesion Promoter | 0.14-0.2% | 0.14-0.2% |
| In Can Preservative | 0.002-0.005% | 0.002-0.005% |
| Biocide | 0.01-0.02% | 0.01-0.02% |
| Cellulose Ether | 0-0.25% | 0-0.25% |
| Acrylic Thickener | 0-0.20% | 0-0.20% |
| UA-HPD (e.g., HYBRIDUR Dispersion | 19.5-23% | 19.5-23% |
| Cabosil /Silica Fume | 0-0.06% | 0-0.06% |
| De-aerator | 0.12-0.18% | 0.04-0.08% |
| Silica Sand/Recycled Glass Filler | 72-80% | 70-78% |
| Decorative Dazzle fillers | | 0-5% |

Fig. 6

UA-HPD Grout Example 3

| Translucent Grout Scale up Formula | | Range, % |
|---|---|---|
| Hydrophylic Ethane-1, 2-diol | Freeze Taw Stabilizers/Co-Solvent | 0.7-0.95 |
| Hydrophobic Glycol Ether | Freeze Taw Stabilizers/Co-Solvent | 0.7-0.95 |
| A blend of Benzisothiazolin and 2-Hydroxyethyl-triazine | In Can Preservative | 0.002-0.005 |
| Microban | Biocide | 0.01-0.02 |
| Hydroxyethylcellulose | Cellulose Ether | 0-0.25 |
| HEUR Based rheological modifier | Acrylic Thickener | 0-0.2 |
| Modified Urea based | Anti-Settling Aid | 0.05-0.1 |
| UA-HPD (Hybrid polymer dispersion) | Dispersion | 15-20 |
| Siloxane based Defoamer | De-aerator | 0.25-0.5 |
| Recycled Glass | Glass Filler | 70-90 |

Fig. 7

UA-HPD Grout Example 4

| Sanded Grout Scale-up Formula | | Range, % |
|---|---|---|
| Hydrophylic Ethane-1, 2-diol | Freeze Taw Stabilizers/Co-Solvent | 0.7-0.95 |
| Hydrophobic Glycol Ether | Freeze Taw Stabilizers/Co-Solvent | 0.7-0.95 |
| A blend of Benzisothiazolin and 2-Hydroxyethyl-triazine | In Can Preservative | 0.002-0.005 |
| Microban | Biocide | 0.01-0.02 |
| Hydroxyethylcellulose | Cellulose Ether | 0-0.25 |
| HEUR Based rheological modifier | Acrylic Thickener | 0-0.2 |
| Modified Urea based | Anti-Settling Aid | 0.05-0.1 |
| UA-HPD (Hybrid polymer dispersion) | Dispersion | 15-20 |
| Siloxane based Defoamer | De-aerator | 0.25-0.5 |
| Colored Silica Sand | Sand Filler | 70-90 |

Fig. 8

Comparative Data Results of Prior Art Grout vs. UA-HPD Grouts of the Invention

| | Prior Art Grout* | 1 | 1A | 2 | 2A | 3 | 3A | 4 | 4A | 5 | 5A | 6 | 6A |
|---|---|---|---|---|---|---|---|---|---|---|---|---|---|
| Hydrophylic Ethane-1, 2-diol | | 0.937 | 0.937 | 0.937 | 0.937 | 0.937 | 0.937 | 0.937 | 0.937 | 0.892 | 0.981 | 1.021 | 0.789 |
| Hydrophobic Glycol Ether | | 0.937 | 0.937 | 0.937 | 0.937 | 0.937 | 0.937 | 0.937 | 0.937 | 0.892 | 0.981 | 1.021 | 0.789 |
| A blend of Benzisothiazolin and 2-Hydroxyethyl-triazine | | 0.004 | 0.004 | 0.004 | 0.004 | 0.004 | 0.004 | 0.004 | 0.004 | 0.004 | 0.005 | 0.004 | 0.004 |
| Microban | | 0.019 | 0.019 | 0.019 | 0.019 | 0.019 | 0.019 | 0.019 | 0.019 | 0.018 | 0.019 | 0.018 | 0.018 |
| HEUR Based rheological modifier | | 0.103 | 0.076 | 0.089 | 0.089 | 0.089 | 0.089 | 0.089 | 0.089 | 0.085 | 0.093 | 0.088 | 0.089 |
| Hydroxyethylcellulose | | 0.019 | 0.019 | 0.022 | 0.016 | 0.019 | 0.019 | 0.019 | 0.019 | 0.018 | 0.02 | 0.019 | 0.019 |
| Modified Urea based Anti settling aid | | 0.049 | 0.049 | 0.049 | 0.049 | 0.056 | 0.041 | 0.049 | 0.049 | 0.046 | 0.051 | 0.048 | 0.048 |
| UA-HPD (Hybrid polymer dispersion) | | 18.91 | 18.915 | 18.912 | 18.913 | 18.911 | 18.913 | 18.911 | 18.913 | 17.999 | 19.799 | 18.688 | 18.776 |
| Siloxane based Defoamer | | 0.049 | 0.049 | 0.049 | 0.049 | 0.049 | 0.049 | 0.056 | 0.041 | 0.046 | 0.051 | 0.048 | 0.048 |
| Silica Sand | | 78.975 | 78.996 | 78.983 | 78.987 | 78.979 | 78.991 | 78.979 | 78.991 | 79.19 | 77.19 | 78.046 | 78.42 |
| Data Measurement | | | | | | | | | | | | | |
| 24 hour Shore A Hardness | 45 | 79 | 68 | 65 | 78 | 65 | 75 | 70 | 65 | 76 | 55 | 65 | 78 |
| Density, g/cm3 | 1.75 | 1.77 | 1.76 | 1.74 | 1.78 | 1.73 | 1.78 | 1.78 | 1.71 | 1.76 | 1.75 | 1.75 | 1.79 |
| Compressive Strength, psi** | 636 | 875 | 892 | 867 | 964 | 969 | 1010 | 971 | 899 | 831 | 781 | 807 | 707 |

*Prior Art water-bourne polyurethane grout
**Measured as per modified ANSI 118.3

Fig. 9

PREMIXED HYBRID GROUT

CROSS REFERENCE TO RELATED APPLICATIONS

This Application is a Continuation Application of U.S. patent application Ser. No. 15/092,000 filed on Apr. 6, 2016, which is a Divisional Application of U.S. patent application Ser. No. 14/290,055 filed on May 29, 2014 which claims priority to U.S. Provisional Patent Application Ser. No. 61/829,143 filed on May 30, 2013.

BACKGROUND OF THE INVENTION

1. Field of the Invention

The present invention is directed to grout, and in particular, to premixed grouts containing a urethane/acrylic hybrid constituent as an active binding agent in the composition, and methods of using the premixed urethane/acrylic hybrid grouts of the invention.

2. Description of Related Art

Various types of grouts exist in today's market for a wide variety of applications. A common usage of grouts is in the construction industry, and in particular, for use in joining tile, masonry and other types of building materials, as well as for filling joints and voids between such materials. Grouts exist in different forms including, for instance, cement-based grouts, polymer modified cement-based grouts, two-part polymer grouts (e.g., epoxy grouts), and one-part polymer grouts. Each of these types of grouts has its advantages and disadvantages.

Cement-based grouts are relatively low cost, easy to apply, and eventually cure into a very hard surface. One of the more common and cost effective cement-based grout is Portland cement. While cement-based grouts are advantageously low cost and readily available in the market place, one of the primary drawbacks of such grouts is in their mixing and slow-strength development. In mixing cement-based grouts, a cement-based material (e.g., a cementitious powder) is combined with water or a latex modifier (e.g., to form a polymer modified cement-based grout), which must then be well blended. A mechanical mixer is often required to blending these cement-based mixtures, whereby such mixers may be costly and difficult to operate. Mixing via a mechanical mixer is also time-consuming process, messy, and often generates large amounts of dust. Other disadvantages of cement-based grouts are that they can often be non-uniform in color and even have poor stain resistance once cured.

Two-part polymer grouts exist as an alternative to cement-based grouts and/or polymer modified cement-based grouts. While two-part polymer grouts may have higher performance criteria, as compared to cement-based and/or polymer modified cement-based grouts, two-part grouts are often difficult to implement since such compositions must be used immediately after mixing. In these two-part polymer grout systems, the first and second parts must be combined in an appropriate ratio and mixed immediately prior to application. Once mixed, the two-part grout composition cures rather quickly, and as such, must be used in a relatively short period of time. Any unused portion of the two-part grout composition is generally wasted.

Epoxy-based grouts are an example of a two-part polymer grout systems, and may even be provided in the form of a three-part grout composition or system. While such epoxy grouts are often hard and resistant to chemicals and stains, drawbacks thereof are the multiple parts of such systems that require mixing as described above. Epoxy-based grouts can be extremely toxic, and often more expensive as compared to alternative grout materials.

As an alternative to grouts requiring mixing, currently available grouts also include premixed and/or one-part grout compositions. Since they come ready to use in a pre-mixed state, these types of grouts are often easier to use than cementitious grouts and/or two- or three-part grout systems. One of the biggest advantages of such premixed grouts is that they do not need to be mixed with other constituent(s) prior to use thereof, which aids in their ease of use. Currently available premixed grouts are also relatively safe and do not generate dust.

A grout installer is provided with a longer time to work with premixed grouts since these types of grouts harden or cure primarily upon drying. In comparison, cementitious grouts often begin to cure or harden upon addition of the aqueous phase (e.g., water), while two-part polymer grouts often begin to cure and harden upon the blending of such two parts. The longer dry time of premixed grouts provides the installer ample time to work with such grouts. Yet, this longer time dry or cure time can also be seen as a disadvantage since premixed grouts are slow to develop strength. The cure or hardening mechanism for these materials is through loss of moisture (e.g., water), which can take several days to cure properly. As such, hardening in cool or humid environments is significantly slowed. Due to this moisture loss, several conventional premixed grouts are also susceptible to shrinkage and/or cracking, particularly, when used with water-absorbing materials (e.g., clay tiles). Another disadvantage is that the currently available premixed grouts are often susceptible to staining.

Several premixed grout compositions exist in the market. For instance, currently available premixed grouts include those containing a water-based dispersion or latex polymer, along with fillers, thickeners and modifiers (e.g., defoamers, surfactants). The water-based dispersion or latex polymer is typically a thermoplastic resin, and is used as a binder in the system. The composition is applied to grout joints and allowed to cure by drying to provide hardness and strength to the applied grout.

Premixed grouts having an acrylic binder (e.g., acrylic polymers and copolymers) were among some of the first premixed grouts commercially available. These types of acrylic binder premixed grouts are designed for use in low demand applications, such as, for use in kitchen backsplashes and/or areas that are not subjected to water. U.S. Pat. Nos. 3,859,233 and 4,472,540 (both to Barker) describe the use of acrylic binder dispersions in grout compositions.

Other premixed grouts on the market include those containing mere simple blends of polyurethane and acrylic. In these grouts, the polyurethane and acrylic components reside in the composition as separate constituents, and may be individually identified, isolated and separated from such composition. In these grouts, a polyurethane component is added to the composition to improve performance of the acrylic-based material including, for instance, improving hardness, abrasion resistance and stain resistance of the resultant grout. U.S. Pat. No. 5,569,696 (to Abramson, et al.) discloses such a premixed grout containing a blend of a polyurethane part in combination with an acrylic part.

In further developments, polyurethane dispersion (i.e., a waterbourne polyurethane) grouts were introduced into the market. These types of premixed grouts contain the polyurethane dispersion as the active binder in the composition. U.S. Pat. No. 7,183,338 (to Warren) describes grouts and grout products including waterbourne polyurethane binder systems. Polyurethane dispersion grout formulations generally exhibit improved performance criteria over that of acrylic binder grout systems or such grouts blended with polyurethane. For instance, polyurethane (waterbourne polyurethane) binder grouts exhibit increased water resistance, hardness, durability and flexibility, as well as enhanced stain resistance. However, these polyurethane dispersion (waterbourne polyurethane) grouts continue to have long cure or hardening times, are expensive, and continue to need improved overall performance characteristics.

While many developments have been made in the grout industry, there continues to be a need for improved grout compositions having increased hardness, strength, durability, flexibility, water resistance, stain resistance, and even faster cure/hardening times as compared to the above discussed prior art grouts.

SUMMARY OF THE INVENTION

Bearing in mind the problems and deficiencies of the prior art, it is therefore an object of the present invention to provide improved grout compositions that produce grout products having increased hardness, strength, durability, flexibility, water resistance, stain resistance, and even faster cure/hardening times as compared to the above discussed prior art grouts.

It is another object of the present invention to provide grout compositions that include a urethane-acrylic hybrid polymer dispersion (UA-HPD) as a binder in combination with filler materials. The filler material may be sand, silica sand, colored silica sand, fine silica, glass, recycled glass, limestone, minerals, any other known filler, or any combinations thereof.

In various aspects of the invention, the UA-HPD grout formulations of the invention may include the UA-HPD binder in combination with a quartz filler material, as well as one or more additional constituents including, but not limited to, a freeze-thaw stabilizer co-solvent, plasticizer, short fibers, glass fibers, an adhesion promoter, a preservative, biocide, cellulose or starch ether, a thickening agent, silica fume, fumed silica, a deaerator, defoamer, and/or surfactant.

It is another object of the present invention to provide UA-HPD grout compositions that include a urethane-acrylic hybrid polymer dispersion (UA-HPD) as a binder present in an amount of about 10-40% by weight of the composition, in combination with one or more filler materials present in an amount of about 60-90% by weight of the composition. The filler material may be sand, silica sand, colored silica sand, fine silica, glass, recycled glass, limestone, minerals, any other known filler, or any combinations thereof. These UA-HPD grout compositions may further include about 0-3 wt. % thickening agent, about 0-1 wt. % preservative, about 0-1 wt. % biocide, fungicide or mildewcide, about 0-3 wt. % defoamer, about 0-10 wt. % decorative fillers, about 0-15 wt. % film forming aids, about 0-5 wt. % crosslinking agents, about 0-5 wt. % stain resistant additives, about 0-5 wt. % adhesion promoters, about 0-5 wt. % coupling agents, about 0-5 wt. % anti-freeze agents, about 0-5 wt. % surfactants, about 0-10 wt. % water, about 0-5 wt. % water retention aid, about 0-5 wt. % UV stabilizers, about 0-5 wt. % acid or base component, about 0-5 wt. % strengthening fibers, as well as any combination of the foregoing materials.

Another aspect of the invention is directed to UA-HPD grout compositions that include about 19-23 wt. % urethane-acrylic hybrid polymer dispersion as a binder, about 70-80 wt. % quartz filler present, with the remainder wt. % of the composition being one or more additional filler materials that add desired characteristics and properties to the UA-HPD grout compositions. The quartz filler may be glass filler or silica sand. The additional filler materials may include one or more constituents comprising a freeze-thaw stabilizer co-solvent, plasticizer, short fibers, glass fibers, an adhesion promoter, a preservative, biocide, cellulose or starch ether, a thickening agent, silica fume, fumed silica, fumed silica/silica fume, a deaerator, defoamer, surfactant, and/or any combination of the foregoing.

In still another aspect, the invention is directed to methods of applying grout by providing spaced-apart building materials affixed to a substrate, whereby unfilled openings reside between the spaced-apart building materials. A grout comprising a one-part admixture of urethane-acrylic hybrid polymer dispersion (UA-HPD) as a binder and filler material is provided and applied between and into the unfilled openings, thereby filling such openings residing between spaced-apart building materials. The spaced-apart building materials may be tile or masonry that are affixed to a subfloor, wallboard or counter. The unfilled openings may be unfilled joints, cracks and lines residing between the spaced-apart building materials (e.g., joints, lines or cracks residing between adjacent tiles).

The UA-HPD grout composition may include 10-40 wt. % of the UA-HPD, and 60-90 wt. % of the filler material. In various embodiments of the invention, the UA-HPD grout composition may include the UA-HPD, first filler material (e.g., a quartz filler material), and one or more additional filler materials that add desired characteristics and properties to the UA-HPD hybrid grout. In certain embodiments, the composition may comprise 19-23 wt. % UA-HPD, 70-80 wt. % quartz filler material, and a remainder wt. % of the one or more additional filler materials. The additional filler materials may include one or more of the following constituents: freeze-thaw stabilizer co-solvent, plasticizer, short fibers, glass fibers, an adhesion promoter, a preservative, biocide, cellulose or starch ether, a thickening agent, silica fume, fumed silica, a deaerator, defoamer, surfactant, decorative fillers, and any combination of the foregoing.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 1A and 1B show exemplary process flows of preparing a urethane-acrylic hybrid polymer dispersions ("UA-HPDs") for use in the present grouts, grout products and methods of using the same in accordance with the various embodiments of the invention.

FIG. 2 shows dynamic mechanical analysis (DMA) data comparing a simple blend with UA-HPDs suitable for use in the various embodiments of the invention.

FIG. 3 shows tensile strengths of exemplary UA-HPDs suitable for use in the various embodiments of the invention.

FIG. 4 is a table showing attributes of film coatings made using UA-HPDs suitable for use in the various embodiments of the invention.

FIGS. 5A-B is a table showing various UA-HPD grout formulations in accordance with the numerous embodiments of the present invention.

FIG. 6 is a table showing one or more embodiments and/or examples of UA-HPD grout compositions in accordance with one or more embodiments of the invention.

FIG. 7 is a table showing one or more alternate embodiments and/or examples of UA-HPD grout compositions in accordance with various embodiments of the invention.

FIG. 8 is a table showing still further alternate embodiments and/or examples of UA-HPD grout compositions in accordance with various embodiments of the invention.

FIG. 9 is a table showing comparative test results of the UA-HPD grout compositions of the invention as compared to results of a conventional one-part grout composition.

DESCRIPTION OF THE PREFERRED EMBODIMENT(S)

In describing the preferred embodiment of the present invention, reference will be made herein to FIGS. 1-9 of the drawings in which like numerals refer to like features of the invention.

The present invention is directed to a unique, ready to use grouting formulation suitable for use in joining tile, masonry, mosaics and other types of building materials, as well as for filling joints and voids between such materials. There are many grouts currently available, with each grout having its own drawbacks, as discussed above. While polyurethane dispersion (i.e., waterbourne polyurethane) grouts may have advantages over cement-based, two- or three-part grouts and even premixed acrylic binder grout systems or blends thereof with polyurethane, such polyurethane dispersions (i.e., waterbourne polyurethane) have disadvantages that in turn generate disadvantages in the grouts formed thereby.

Disadvantages of polyurethane dispersions are disclosed in the following references, which are discussed herein below: "HYBRID VIGOUR: Waterborne Urethane-Acrylics combine High Performance with Low VOC Content;" Lim, Galgoci, Walker and Yoxheimer; ECJ (05), 24-30, (2005); and "Solvent-Free Urethane-Acrylic Hybrid Polymers for Coatings;" Galgoci, Hegedus, Walker, Tempel, Pepe, Yoxheimer and Boyce; *JCT CoatingsTech,* 2(13), 28-36 (February 2005).

Waterbourne polyurethane dispersions (referred to as "PUDs") have been used as binders for a variety of one-component coatings for wood (floors and furniture), plastic (business machine housings), leather, metal, and concrete. In general, PUDs are prepared by reacting an excess of diisocyanate with a polyol, dispersing the resulting prepolymer in water, and completing the reaction by adding a water-soluble diamine to consume the residual isocyanate and, thereby, chain-extend the prepolymer to a high molecular weight.

The dispersed PUD particles are usually anionically stabilized, which is commonly accomplished by incorporating a carboxylic acid-functional polyol into the backbone of the polyurethane and neutralizing the acid groups with a tertiary amine. Thus, in many cases, no external surfactants are present to contribute adversely to water sensitivity of PUD-based coatings. PUDs are available in both aromatic and aliphatic varieties.

One of the main disadvantages of PUDs is their relatively high cost. In order to reduce costs, formulators have blended PUDs with an acrylic polymer emulsion. However, the PUD and acrylic polymer remain as separate components (i.e., able to be separated and isolated form each other) within the blended formulation. Further, it has been found that the acrylics reduce the overall performance of the PUD binder within the composition. On a molecular level, the acrylic polymers are not soluble in the polyurethane polymers, such that, the polymers remain phase-separated during use, which may diminish performance behavior.

To overcome the deficiencies of PUDs, and PUD and acrylic polymer blends, urethane-acrylic hybrid polymer dispersions (referred to as "UA-HPD"), have been formulated. U.S. Pat. No. 5,594,065 (to Tien, et al.), which is herein incorporated by reference in its entirety, describes urethane-acrylic hybrid polymer dispersions, which are commercially available from assignee Air Products and Chemicals, Inc. of Allentown, Pa. and sold under the trademark Hybridur®. These UA-HPD incorporate both urethane and acrylic polymers into a single dispersion, whereby such constituents are chemically altered into a single, unique compound with such constituents being inseparable from each other (cannot) isolate one from the other.

UA-HPDs may be formed by different techniques and processes. FIGS. 1A and 1B show exemplary alternate process flows for preparing a first UA-HPD (Type 1 hybrid) and a second UA-HPD (Type 2 hybrid). As shown in FIG. 1A, a Type 1 UA-HPD is formulated by first preparing a PUD followed by adding acrylic monomers to the PUD so that an acrylic polymer is formed in the presence of the PUD to generate the UA-HPD. Type 2 UA-HPDs may be formulated by forming a polyurethane prepolymer and adding acrylic monomers thereto, whereby the mixture is dispersed in water, and the urethane and acrylic polymerizations are completed concurrently.

The UA-HPD's are unique molecules and not a mere blend of one part with another part in the composition. It has been found that UA-HPD's generate a gel (via gel testing), have a single broad plateau for glass transition temperature ($T_g$) test, the polyurethane can not be extracted from the product, and the physical properties thereof are better than that of a simple waterbourne polyurethane and acrylic polymer blend. All of the foregoing factors are evidence of cross-linking, which is indicative that an UA-HPD undergoes molecular change (i.e., it is a unique molecule and not a mere blend). In comparison, it has also been found that waterbourne polyurethane and acrylic polymer blends do not generate a gel (via gel testing), produce two unique peaks in $T_g$ testing, and the polyurethane or acrylic may be extracted from the blend, all of which are indicative that the two components remain separate in solution with no cross-linking.

FIG. 2 shows dynamic mechanical analysis (DMA) data comparing a simple blend with different UA-HPD's. As shown, the simple blend has 2 distinct tan delta (tan δ) peaks, which correspond to the glass transition temperatures ($T_g$) for the phase-separated urethane and acrylic polymers. The Type 1 UA-HPD hybrid prepared from FIG. 1A shows 2 $T_g$ peaks, but the peaks have become somewhat broader, which is indicative of molecular mixing.

Alternatively, the Type 2 UA-HPD hybrid prepared from FIG. 1B, in which the urethane prepolymer and acrylic monomers are homogeneously mixed prior to dispersion and subsequent polymerization, shows only a single, very broad tan δ peak. The single peak, which spans the temperature range between the theoretical $T_g$s of the urethane and acrylic polymers, shows a significant amount of polymer-polymer, wherein it is believed these different polymer molecules are intertwined or cross-linked similar to that of an interpenetrating network (IPN). This improved compatibility for the hybrids (especially Type 2) is at least partly the result of some molecular-level grafting (cross-linking) of the two polymers.

The Type 1 UA-HPD and Type 2 UA-HPD have been used to form film coatings, and the resultant coating have exhibited enhanced strength over that of PUDs or simple blends (e.g., a polyurethane blended with an acrylic polymer). FIG. 3 shows tensile strengths of films prepared from blends and the Type 1 UA-HPD and Type 2 UA-HPD, which are compared to that predicted by a linear rule of mixtures. The blend and the UA-HPD hybrids contained equal amounts of the same urethane and acrylic polymers. As shown, the tensile strength of the blend was found to be lower than that predicted by the simple averaging rule. On the other hand, the hybrid systems show higher tensile strengths than predicted. The Type 1 hybrid system showed slightly higher tensile strength than predicted. The Type 2 hybrid was found to have a tensile strength approximately equal to that of the polyurethane. The Type 2 hybrid has the increased phase morphology of a unique urethane/acrylic polymer system, as compared to the Type 1 hybrid.

UA-HPDs may be prepared using an aprotic solvent such as N-methylpyrrolidone (NMP). The NMP is required in the polyurethane prepolymer step to dissolve the dimethylolpropionic acid (DMPA), which is a crystalline carboxylic acid-polyol that is virtually insoluble in the polyoldiisocyanate mixture that reacts to form the urethane prepolymer. The NMP remains in the final dispersion product, with an amount that may range from 3% to 8% in the UA-HPD. NMP is beneficial in the final product as a coalescing solvent for film formation. However, since NMP and high levels of residual acrylic monomers are undesired due to odor and regulatory issues, UA-HPDs are also available as NMP-free, low residual monomer UA-HPDs having acceptable workability and results criteria.

To date, the use of UA-HPDs has been limited to film or coating formations. Attributes of test results from such films/coatings are shown in FIG. 4. The present invention extends the use and application of the various types of UA-HPDs by providing grouts, grout products and methods of using such grouts, whereby the grout contains at least a urethane-acrylic hybrid polymer dispersion ("UA-HPD") as the active binding agent in combination with one or more filler materials.

While the Type 1 UA-HPDs and Type 2 UA-HPDs are described and discussed herein (as well as those in U.S. Pat. No. 5,594,065), it should be appreciated and understood that the various grouts, grout products and methods of using such grouts of the invention are not limited to such UA-HPDs. Rather, any and all current and future UA-HPD formulations may be implemented in accordance with the various grouts, grout products and methods of use thereof in accordance with the numerous embodiments of the invention.

While not meant to limit the invention, in one or more embodiments a preferred UA-HPD(s) for use in one or more embodiments may include those sold by Air Products and Chemicals, Inc. of Allentown, Pa., under the trademark Hybridur®. Again, it should be appreciated and understood that the present invention is not limited to the foregoing described urethane-acrylic hybrid polymer dispersions, and may include any known and/or to be developed urethane-acrylic hybrid polymer dispersion(s). Such UA-HPD(s) may contain a solvent (e.g., N-methylpyrrolidone (NMP) solvent), or be solvent-free versions of UA-HPDs. The UA-HPD(s) suitable for use in one or more embodiments of the invention exhibit the hybrid nature of being a unique molecule formulated within the polymer dispersion (i.e., it is not a blend or mere mixture of two or more constituents).

Referring to the various grouts, grout products and methods of using such grouts in accordance with the invention, the table of FIGS. 5A-B show various formulations of the present UA-HPD containing grout compositions in accordance with different embodiments of the invention.

In one or more embodiments, the premixed grouts and grout products of the invention include a urethane-acrylic hybrid polymer dispersion ("UA-HPD") as the active binding agent in combination with one or more filler materials. The UA-HPD binding agent may be provided in an amount of about 10%-40% by weight of the total composition. In such embodiments, the filler materials may be provided in an amount of about 60%-90% by weight of the composition. Filler materials may be any material that fills voids between larger particles to improve shrinkage, hardness, reduce porosity, improve water resistance, etc. of the final grout. For instance, fillers suitable for use include, but are not limited to, sand, silica sand, colored silica sand, fine silica, glass, recycled glass, recycled glass filler, limestone (calcium carbonate), minerals, any other known filler, or even combinations of the foregoing.

In one or more embodiments the premixed grouts and grout products of the invention may include one or more of the additional constituents as listed in FIGS. 5A-B. In particular, in addition to the UA-HPD and filler materials, the present grouts may further include a thickener for improving shelf stability of the grout. The thickening agent minimizes separation or settling of ingredients within the composition. It also improves rheology or workability of the final grout product. Suitable thickeners include, but are not limited to, cellulose ether, starch ether, fibers, silica fume, fumed silica, associative and alkali swellable thickeners, an acrylic thickener, and the like. Thickening agents may be present in the compositions of the invention in amounts ranging from about 0-3% by weight of the composition.

Decorative fillers may also be provided within the present UA-HPD grouts. These decorative fillers improve aesthetics of the grout product, and may even provide translucency or reflective effects in the final cured product. Decorative fillers may include, but are not limited to, reflective particles, glass or colored beads, dyes, pigments, and the like. The decorative fillers may be provided in the grout compositions in amounts ranging from about 0-10% by weight of the composition.

In addition, the various UA-HPD grout compositions of the invention may include a variety of alternate binders in addition to the UA-HPD binders. These alternate binders may be provided in the present grout formulations, in addition to the UA-HPD binder, for reducing costs of the resultant grout products and compositions. The alternate binders may be added in amounts of about 0%-25% by weight of the total composition, and may include blends with conventional binders such as acrylics. Fibers may also be added to the present grout compositions in amounts of about 0%-5% by weight. The fibers are added to improve cohesive strength of the instant wet formulations, improve their strength when cured, reduce shrinkage and even reduce cracking. Various types of fibers may be added including, but not limited to, polymer or glass fibers of various lengths. The grout compositions may also include polyethylene fibers.

Preservatives or biocides may also be provided in the present grout compositions. The preservative/biocide component increases the shelf life of the present grout products by inhibiting biological growth. Preservatives or biocides may be present in the compositions of the invention in amounts ranging from about 0-1% by weight of the composition. The compositions may also include one or more fungicides and/or mildewcides for improving performance of the grout by minimizing biological growth during use of the grouts, as well as the final cured product. Fungicides and/or mildewcides may be present in the grouts of the invention in amounts ranging from about 0-1% by weight of the composition.

Another constituent that may be added to the UA-HPD grout compositions of the invention are defoamers. A defoamer reduces air entrainment during manufacturing and application. It also improves strength and stain resistance of the final cured grouts of the invention. Defoamers may be present in the UA-HPD grouts of the invention in amounts ranging from about 0-3% by weight of the composition.

The UA-HPD grouts of the invention may further include film forming aids (co-solvents) in an amount ranging from about 0-15% by weight of the composition. The film forming aids improve film formation at lower temperatures, and as such, provide higher strength and hardness. They may also improve stability to freezing and thawing of the present grouts. Crosslinkers or other reactive components may also be added to the present UA-HPD grout compositions in amounts ranging from about 0-5% by weight of the composition. These constituents are added to improve hardness, water resistance, chemical resistance, stain resistance, and abrasion resistance.

Adhesion promoters or coupling agents may further be added to the present UA-HPD grouts in amounts ranging from about 0-5% by weight of the composition. These adhesion promoters or coupling agents improve bonding or compatibility between binder and fillers or substrates. The instant UA-HPD grout formulations of the invention may also include stain resistant additives including, but not limited to, wax emulsions, wax particles, fluoro-carbon based particles and emulsions, silicone-based particles and emulsions, hydrophobes such as oleates and stearates, and the like. These stain resistant additives may be added in amounts of 0-5% by weight to improve resistance to water-based and/or oil-based stains, as well as improve water and oil resistance.

Surfactants may be added to the instant UA-HPD grout compositions in amounts of 0-5% by weight of the composition to improve wetting of fillers and substrates. These surfactants also help to reduce viscosity, eliminate entrained air, and even stabilize the grout formulation. Water may be added in amounts of 0-10% by weight to reduce viscosity and act as a diluent. Still further, water retention aids (e.g., cellulose ethers, starches, co-solvents, etc.) may be added in amounts of 0-5% by weight to hold or retain moisture within the present UA-HPD grout compositions during use thereof. By holding or retaining water, the water retention improve application characteristics and assist cleanup.

The various UA-HPD grouts of the even may also include about 0-5%, by weight, of UV stabilizers, and about 0-5%, by weight, of acids or bases. The UV stabilizers improve resistance to UV light, as well as provide for improved color stability and reduce yellowing or discoloration. The acids or bases allow for the adjustment of the composition pH to improve formulation stability. Still further, the instant UA-HPD grouts may include anti-freeze components (e.g., glycols, various co-solvents, etc.) in amounts of 0-5%, by weight, to reduce the freezing point of the composition for preventing damage thereof during extreme temperatures. Hence, the anti-freeze components also improve storage stability of the instant UA-HPD grouts.

While the above embodiments disclose various formulations and constituents that may be added to the instant grout compositions that at least include an UA-HPD composition, it should be appreciated that the invention is not limited to such formulations. Referring to FIG. 6, one or more exemplary embodiments of the grout compositions of the invention are shown including, by weight percent of the composition: 19.5-23 wt. % UA-HPD (e.g., Hybridur® dispersion); 70-80 wt. % Silica Sand/Recycled Glass Filler (100 Mesh quartz particles) (preferably, 72-80 wt. % or 70-78 wt. %); 0.80-1.5 wt. % freeze-Thaw Stabilizer/Co-solvent or plasticizer (preferably, 0.85-0.95 wt. % or 0.8-1.5 wt. %); 0-0.3 wt. % Short Filler/Rheologicial Modifier—Short Fibers (Polyethylene) or glass fibers; 0.14-0.2 wt. % Adhesion Promoter; 0.002-0.005 wt. % Preservative; 0.01-0.02 wt. % Biocide; 0-0.25 wt. % Cellulose Ether or starch ether; 0-0.20 wt. % Acrylic Thickener; 0-0.06 wt. % Cabosil/Silica Fume; 0.04-0.18 wt. % deaerator, defoamer or surfactant (preferably, 0.12-0.18 wt. % or 0.04-0.08 wt. %); and optionally 0-5 wt. % Decorative Dazzle silica sand/recycled glass filler (100 mesh quartz particles) (preferably, 72-80 wt. % or 70-78 wt. %); 0.80-1.5 wt. % freeze-thaw stabilizer/co-solvent or plasticizer (preferably, 0.85-0.95 wt. % or 0.8-1.5 wt. %); 0-0.3 wt. % short fiber/rheologicial modifier—short fibers (polyethylene) or glass fibers; 0.14-0.2 wt. % adhesion promoter; 0.002-0.005 wt. % preservative; 0.01-0.02 wt. % biocide; 0-0.25 wt. % cellulose ether or starch ether; 0-0.20 wt. % acrylic thickener; 0-0.06 wt. % fumed silica/silica fume; 0.04-0.18 wt. % deaerator, defoamer or surfactant (preferably, 0.12-0.18 wt. % or 0.04-0.08 wt. %); and optionally 0-5 wt. % decorative dazzle fillers.

Still other exemplary embodiments of the invention are shown in FIGS. 7 and 8. Referring to FIG. 7, in one or more exemplary embodiments of the invention the present UA-HPD grouts of the invention may be formed as a translucent grout product. In these embodiments, the translucent UA-HPD grouts may include in combination: a first freeze thaw stabilizers/co-solvent (e.g., hydrophilic ethane-1, 2-diol) in an amount of 0.7-0.95 wt. %; a second freeze thaw stabilizers/co-solvent (e.g., hydrophobic glycol ether) in an amount of 0.7-0.95 wt. %; an in-can preservative (e.g., a blend of benzisothiazolin and 2-hydroxyethyl-triazine) in an amount of 0.002-0.005 wt. %; a biocide (e.g., Microban™) in an amount of 0.01-0.02 wt. %; cellulose ether (e.g, hydroxyethylcellulose) in an amount of 0-0.25 wt. %; acrylic thickener (e.g, HEUR based rheological modifier) in an amount of 0-0.2 wt. %; anti-settling aid (e.g, modified urea) in an amount of 0.05-0.1 wt. %; UA-HPD (i.e., hybrid polymer dispersion) in an amount of 15-20 wt. %; a de-aearator (e.g., a siloxane based defoamer) in an amount of 0.25-0.5 wt. %; and glass filler (e.g., recycled glass) in an amount of 70-90 wt. %. It should be appreciated that any combination of these constituents may be implemented in preparing the UA-HPD grouts and UA-HPD grout products of the invention, or all of such constituents may be used in combination with each other in the above disclosed weight percent ranges.

As shown in FIG. 8, in one or more other exemplary embodiments of the invention, the UA-HPD grouts of the invention may be formed as scaled-up sanded UA-HPD grout formulations. In one or more embodiments, these UA-HPD grouts may include at least one or more of the following constituents: a first freeze thaw stabilizers/co-solvent (e.g., hydrophilic ethane-1, 2-diol) in an amount of 0.7-0.95 wt. %; a second freeze thaw stabilizers/co-solvent (e.g., hydrophobic glycol ether) in an amount of 0.7-0.95 wt. %; an in-can preservative (e.g., a blend of benzisothiazolin and 2-hydroxyethyl-triazine) in an amount of 0.002-0.005 wt. %; a Biocide (e.g., Microban™) in an amount of 0.01-0.02 wt. %; cellulose ether (e.g, hydroxyethylcellulose)

in an amount of 0-0.25 wt. %; acrylic thickener (e.g, HEUR based rheological modifier) in an amount of 0-0.2 wt. %; anti-settling aid (e.g, modified urea or modified urea based anti-settling aid) in an amount of 0.05-0.1 wt. %; UA-HPD (i.e., hybrid polymer dispersion) in an amount of 15-20 wt. %; a de-aearator (e.g., a siloxane based defoamer) in an amount of 0.25-0.5 wt. %; and sand filler (e.g., colored silica sand) in an amount of 70-90 wt. %.

The UA-HPD containing grout compositions of the invention have superior performance as compared to mere PUD containing grout compositions. The various UA-HPD containing grout compositions of the invention have enhanced hardness, abrasion resistance and stain resistance, as well as harden or cure at an efficient and easy to use rate, as compared to currently available ready to use grouts (in particular, PUD containing grouts). The improved performance of the instant UA-HPD containing grouts is in the unique interpenetrating network microstructure of the urethane-acrylic hybrid polymer dispersions, which is due to the interaction and grafting on a molecular level between the urethane and acrylic portions.

The various UA-HPD grouts of the invention preferably comprise premixed and/or one-part grout composition mixtures that are easy and ready to use formulations, may be fabricated in a variety of colors, include different decorative features (e.g., sparkles, speckled patterns, etc.), resist to discoloration, fading and staining, and are resistant to abrasions and cracking due to applied stresses. The present UA-HPD grouts may be used in the installation of a variety of different tiles, masonry and other types of building materials, as well as for filling joints and voids between such materials. In use, the present UA-HPD grouts of the invention may be applied directly from a container, without mixing, onto a substrate (e.g., floor, wall, counter, etc.) to fill openings, spaces, joints, cracks and/or lines residing therebetween.

The premixed UA-HPD grouts of the invention have a workable consistency that enables such UA-HPD grouts to be applied into and fill thick and/or thin lines and cracks residing between adjacent masonry, particularly, tiles (e.g., ceramic tiles) after such tiles have been affixed (e.g., with adhesive) to a substrate (e.g., subfloor, wall panel, counter, etc.). A trowel and/or other masonry tools may be used to work the UA-HPD grouts into and fill these lines and cracks. Once worked into the lines and cracks, excess UA-HPD grout material is removed from the surface of the tile, and the UA-HPD grouts of the invention are allowed to cure over a period of approximately twenty-four hours.

Referring to FIG. 9, numerous different sanded formulation embodiments of the present UA-HPD grouts were prepared and comparison tested to a conventional one-part premixed waterbourne polyurethane blend grout applied and cured under the same processing conditions. In the example comparative inventive UA-HPD grouts shown in FIG. 9, amounts of selected constituents were altered (i.e., +15%, −15%) in the grout formulations, and all allowed to cure under the same processing conditions. For instance, in the examples the following constituents were altered +15%, −15%: in examples 1 and 1A thickener wt. %, in examples 2 and 2A cellulose ether wt. %, in examples 3 and 3A anti-settling aid wt. %, in examples 4 and 4A defoamer wt. %, and in examples 5 and 5A sand filler wt. %. In examples 6 and 6A, the test UA-HPD grouts were altered by fabricating formulations in different aqueous phases with example 6 having +10% solvent and example 6A having −10% solvent.

The comparative grouts were set up for a series of tests to measure the hardness and compressive strengths, including, testing for specific gravity (density), A shore hardness and compressive strength (psi, modified ANSI 118.3 method). The specific gravity (density) was measured by filling a standard cup of known volume and weight of material in the cup was recorded. For the hardness test, a standard cap was filled with the material and allowed to harden at ambient temperature for 24 hours. Shore A hardness was then recorded for each tested grout after 24 hours. For the compressive strength test, a standard one-inch cylindrical mold was filled with the material as per ANSI 118.3. The molds were heat cured for 3 days in a 50 deg. C. oven. The samples were then de-molded and cured in a controlled temp chamber and tested after 25 days (28 day measurement from the day of filling the molds).

The results of FIG. 9 show that the specific gravity of each of the formulas was maintained within a certain range, which indicates that the workability was kept relatively constant. Also, all of the instant UA-HPD grout formulations had similar consistency for use as a grout. The table shows that the present UA-HPD grouts and grout products of the invention have both superior hardness after 24 hours and compressive strength as compared to the tested commercially available one-part waterbourne polyurethane blend grout. The increased hardness measures of the UA-HPD grouts indicates quicker walk over time, or time to traffic. The compressive strength of one inch UA-HPD grout cylinders as tested per modified ANSI 118.3 were much higher than that of the commercially available one-part waterbourne polyurethane blend grout. All of this performed testing and results shown in FIG. 9 evidences that the instant UA-HPD grouts and grout products of the invention are superior in performance as compared to the tested prior art waterbourne polyurethane based grout.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A grout composition comprising:
   a urethane-acrylic hybrid polymer dispersion (UA-HPD) binder present in an amount greater than 15 wt. %, based on a weight of the composition;
   a first filler material present in an amount of about 60-90 wt. %; and
   one or more additional filler materials that add desired characteristics and properties to said grout,
   wherein wt. % are all based on a total weight of the grout composition.

2. The grout composition of claim 1 wherein the UA-HPD is present in an amount of greater than 15 wt. % to 40% by weight of the composition.

3. The grout composition of claim 2 wherein the first filler material is present in an amount of about 70-80% by weight of the composition.

4. The grout composition of claim 1 wherein the first filler material is selected from the group consisting of sand, silica sand, colored silica sand, fine silica, glass, recycled glass, limestone, minerals, and combinations thereof.

5. The composition of claim 1 wherein the first filler material is a quartz filler material in combination with said one or more additional filler materials that add desired characteristics and properties to said grout.

6. The composition of claim 5 wherein the one or more additional filler materials are selected from the group consisting of freeze-thaw stabilizer co-solvent, plasticizer, short fibers, glass fibers, an adhesion promoter, a preservative, biocide, cellulose or starch ether, a thickening agent, silica fume, silica fume, a deaerator, defoamer, surfactant, and any combination of the foregoing.

7. The composition of claim 5 wherein the quartz filler material is present in an amount of about 70-80 wt. %, with the one or more additional filler materials comprising the remainder wt. % of the grout composition.

8. The grout composition of claim 7 wherein the additional filler material comprises a freeze-thaw stabilizer co-solvent or plasticizer in an amount of about 0.80-1.5 wt. %.

9. The grout composition of claim 8 wherein the additional filler material comprises an adhesion promoter in an amount of about 0.14-0.2 wt. %.

10. The grout composition of claim 9 wherein the additional filler material comprises preservative in an amount of about 0.002-0.005 wt. %.

11. The grout composition of claim 10 wherein the additional filler material comprises deaerator, defoamer, surfactant each in amounts of about 0.04-0.18 wt. %.

12. The grout composition of claim 11 further including one or more of the following additional filler materials selected from the group consisting of strengthening fibers, short fibers, glass fibers, biocide, fungicide, mildewicide, film forming aids, surfactants, crosslinking agents, coupling agents, cellulose ether, starch ether, thickening agent, silica fume, water or a water retention aid agent, UV stabilizers, acid or base component, decorative fillers, coloring or pigment agent, stain resistant additives, and any combination of the foregoing.

13. A grout composition consisting essentially of:
urethane-acrylic hybrid polymer dispersion (UA-HPD) as a binder present in an amount of greater than 15 wt. %, based on a weight of the composition;
a first filler material present in an amount of about 70-80 wt. %; and
one or more additional filler materials that add desired characteristics and properties to said grout,
wherein wt. % are all based on a total weight of the grout composition.

14. The grout composition of claim 13 wherein the first filler material comprises a quartz filler selected from the group consisting of sand, silica sand, colored silica sand, fine silica, glass, recycled glass, and any other known filler.

15. The grout composition of claim 13 wherein the one or more additional filler materials include one or more constituent selected from the group consisting of a freeze-thaw stabilizer co-solvent or plasticizer, adhesion promoter, preservative, deaerator, defoamer, surfactant, strengthening fibers, short fibers, glass fibers, biocide, fungicide, mildewicide, film forming aids, crosslinking agents, coupling agents, cellulose ether, starch ether, thickening agent, silica fume, water or a water retention aid agent, UV stabilizers, acid or base component, decorative fillers, coloring or pigment agent, stain resistant additives, and any combination of the foregoing.

16. The grout composition of claim 13 wherein the one or more additional filler materials at least include freeze-thaw stabilizer co-solvent or plasticizer in an amount of about 0.80-1.5 wt. %, adhesion promoter in an amount of about 0.14-0.2 wt. %, preservative in an amount of about 0.002-0.005 wt. %, and deaerator, defoamer, surfactant each in amounts of about 0.04-0.18 wt. %.

17. The grout composition of claim 16 wherein the one or more additional filler materials may further include short fibers or glass fibers in an amount of about 0-0.3 wt. %, biocide in an amount of about 0-0.02 wt. %, cellulose or starch ether in an amount of about 0-0.25 wt. %, thickening agent is an acrylic thickener in an amount of about 0-0.20 wt. %, silica Fume in an amount of about 0-0.06 wt. %, decorative fillers in an amount of about 0-5 wt. %, and any combination of the foregoing.

18. A method of applying grout between spaced-apart building materials comprising:
providing spaced-apart building materials affixed to a substrate whereby unfilled openings reside between said spaced-apart building materials;
providing a UA-HPD hybrid grout comprising a one-part admixture of urethane-acrylic hybrid polymer dispersion (UA-HPD) as a binder present in an amount greater than 15wt. %, based on a weight of the composition, a first filler material present in an amount of about 70-80 wt. %; and one or more additional filler materials, wherein wt. % are all based on a total weight of the grout composition; and
applying the UA-HPD hybrid grout to fill said unfilled openings residing between said spaced-apart building materials.

19. The method of claim 18 wherein said spaced-apart building materials comprise spaced-apart tiles or masonry.

20. The method of claim 18 wherein said spaced apart building materials are affixed substrate selected from the group consisting of a subfloor, wallboard, and counter.

* * * * *